(12) United States Patent
Ogasawara

(10) Patent No.: US 6,172,957 B1
(45) Date of Patent: Jan. 9, 2001

(54) OPTICAL PICKUP AND MULTI-LAYER DISC PLAYBACK APPARATUS

(75) Inventor: Masakazu Ogasawara, Tsurugashima (JP)

(73) Assignee: Pioneer Electronics Corporation, Tokyo (JP)

( * ) Notice: Under 35 U.S.C. 154(b), the term of this patent shall be extended for 0 days.

(21) Appl. No.: 09/047,219

(22) Filed: Mar. 25, 1998

(30) Foreign Application Priority Data

Mar. 27, 1997 (JP) .................................................. 9-093247

(51) Int. Cl.$^7$ ...................................................... G11B 7/00
(52) U.S. Cl. ................................ 369/94; 54/112; 54/44.32
(58) Field of Search .................................. 369/112, 109, 369/110, 44.23, 44.24, 94, 54

(56) References Cited

U.S. PATENT DOCUMENTS

| | | | |
|---|---|---|---|
| 5,381,401 | * | 1/1995 | Best et al. ............................... 369/94 |
| 5,638,353 | * | 6/1997 | Takahashi ............................. 369/112 |
| 5,677,903 | * | 10/1997 | Holtslag et al. ........................ 369/94 |
| 5,734,637 | * | 3/1998 | Ootaki et al. .......................... 369/112 |
| 5,748,602 | * | 5/1998 | Chao et al. ............................ 369/112 |
| 5,748,603 | * | 5/1998 | Kim et al. .............................. 369/112 |
| 5,757,742 | * | 5/1998 | Akiba et al. ........................... 369/110 |
| 5,757,744 | * | 5/1998 | Akkermans ............................ 369/94 |
| 5,768,242 | * | 6/1998 | Juday ..................................... 369/112 |
| 5,796,683 | * | 8/1998 | Sumi et al. ............................ 369/112 |
| 5,808,993 | * | 9/1998 | Lee ........................................ 369/112 |
| 5,859,818 | * | 1/1999 | Tateishi et al. ........................ 369/112 |
| 5,914,923 | * | 6/1999 | Araki et al. ............................ 369/112 |
| 5,917,791 | * | 6/1999 | Tsuchiya et al. ...................... 369/112 |
| 5,930,219 | * | 7/1999 | Kim ....................................... 369/112 |
| 5,936,923 | * | 8/1999 | Ootaki et al. .......................... 369/112 |
| 5,949,748 | * | 9/1999 | Iwasaki et al. ........................ 369/112 |

FOREIGN PATENT DOCUMENTS 8-212611   8/1996   (JP) .
9-128785   5/1997   (JP) .

* cited by examiner

Primary Examiner—Nabil Hindi
(74) Attorney, Agent, or Firm—Morgan, Lewis & Bockius LLP

(57) ABSTRACT

An optical pickup for use in a multi-layer disc playback apparatus for playing back a multi-layer disc having a plurality of recording layers including a wave front aberration correcting means that is disposed in an optical path between a light source and an objective lens and corrects wave front aberration of light emitted from the light source in accordance with a recording layer to be played back.

12 Claims, 6 Drawing Sheets

OPTICAL PICKUP AND MULTI-LAYER DISC PLAYBACK APPARATUS

This application claims the benefit of Japanese Application Number 9-93247 filed on Mar. 27, 1997, which is hereby incorporated by reference.

BACKGROUND OF THE INVENTION

1. Field of the Invention

The present invention relates to a disc playback apparatus, and more particularly, to an optical pickup for use in playing back a multi-layer disc and a multi-layer disc playback apparatus for reproducing recorded information from the multi-layer disc.

2. Description of the Related Art

A Digital Video Disc (DVD) is an optical disc capable of storing a large amount of digital information. It is capable of storing digital information, such as animation and computer information, in a disc of the same 12 cm diameter as a compact disc (CD); at a recording density 6–8 times greater than a CD. Various devices are used in recording onto a DVD to achieve such high density recording. For example, the DVD uses a laser having a wavelength of 650 nm or 635 nm, shorter than a wavelength of 780 nm used for a CD, to increase the recording capacity. The numeral aperture, NA, of an objective lens is 0.6, larger than the NA of 0.45 for a CD. As a result, a high density recording of about 5 G byte has been achieved on a single side of the disc.

Because the DVD is of higher density recording than a CD, the spot diameter of a laser beam for reproducing bit information needs to be far smaller than that of the CD. The spot diameter of a laser beam is proportional to the wavelength $\lambda$ of the laser beam and inversely proportional to the numeral aperture NA of an objective lens. In the DVD, this is realized by using a laser beam having a short wavelength and an objective lens having a large numeral aperture NA.

Further, by using a multi-layer disc composed of a plurality of recording layers instead of a single layer recording disc, a further high-density disc has been realized. In such a multi-layer disc, the focal point of the light beam is set to a desired recording layer for recording or reproduction.

FIG. 6 illustrates light beam behavior due to wave front aberration when data in a multilayer disc is reproduced by a single pickup. An objective lens 602a of the pickup illustrates the position thereof when a first recording layer 601a of the multi-layer disc 610 is being played back. An objective lens 602b illustrates the position thereof when the n-th layer, which is far from the disc substrate surface 601s is being played back.

In a pickup optimally designed for focusing a light beam on the first layer, there is no trouble in playing back the first layer. However, if the objective lens approaches the disc substrate surface 601s to play back the n-th layer and the light beam is focused on the n-th layer, wave front aberration occurs due to the thickness of layers between the first layer and the n-th layer. As a result, as shown in FIG. 6, the diameter of the beam spot irradiated onto the n-th layer is larger than that on the first layer.

In the multi-layer disc, a distance from the recording layer optimally designed for the optical pickup creates a difference in the diameter of the beam spot actually focused on the layer. As a result, wave front aberration (mainly spherical aberration) occurs, and each recording layer has a different wave front aberration. Particularly, a recording layer far from the recording layer optimally designed is more affected by the wave front aberration.

That is, when a light beam is gathered onto a recording layer other than the optimally designed recording layer for the optical pickup, the light beam cannot be focused due to an influence of the aforementioned wave front aberration. Thus, in recording layers other than the optimally designed recording layer, it is necessary to enlarge the pit size or pit interval. Accordingly, the recording density per layer drops. As a result, the recording density of the overall multi-layer disc cannot be raised as much as desired.

SUMMARY OF THE INVENTION

Accordingly, the present invention is directed to an improved optical pickup that substantially obviates one or more of the problems due to limitations and disadvantages of the related art.

An object of the invention to provide a multi-layer disc playback apparatus capable of playing back a multi-layer disc having a high recording density per layer, by correcting wave front aberration caused due to a difference in distance between an optimally designed recording layer for an optical pickup and each of the recording layers.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the improved optical pickup and multi-layer disc playback apparatus includes an optical pickup for use in a multi-layer disc playback apparatus for playing back a multi-layer disc having a plurality of recording layers, comprising a wave front aberration correcting means which is disposed in optical path between a light source and an objective lens and corrects wave front aberration of light emitted from the light source in accordance with a recording layer to be played back.

Further, the present invention provides a multi-layer disc playback apparatus for playing back a multi-layer disc having a plurality of recording layers, comprising a selection means for selecting a recording layer to be played back, a reproduction means for reproducing information recorded in the recording layer according to a signal read by the optical pickup, a wave front aberration correcting means which is disposed in optical path between a light source and an objective lens of the optical pickup and corrects wave front aberration of light emitted from the light source, and a control means for controlling the wave front aberration correcting means depending on a selected recording layer.

According to the present invention, when a multi-layer disc is played back, its wave front aberration that occurs due to a difference of distance between the optimally designed recording layer for the optical pickup and each of the recording layers is corrected. Thus, it is possible to play back a multi-layer disc having a higher recording density per layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Hereinafter, the embodiment of the present invention will be described with reference to the accompanying drawings.

Figure 1:
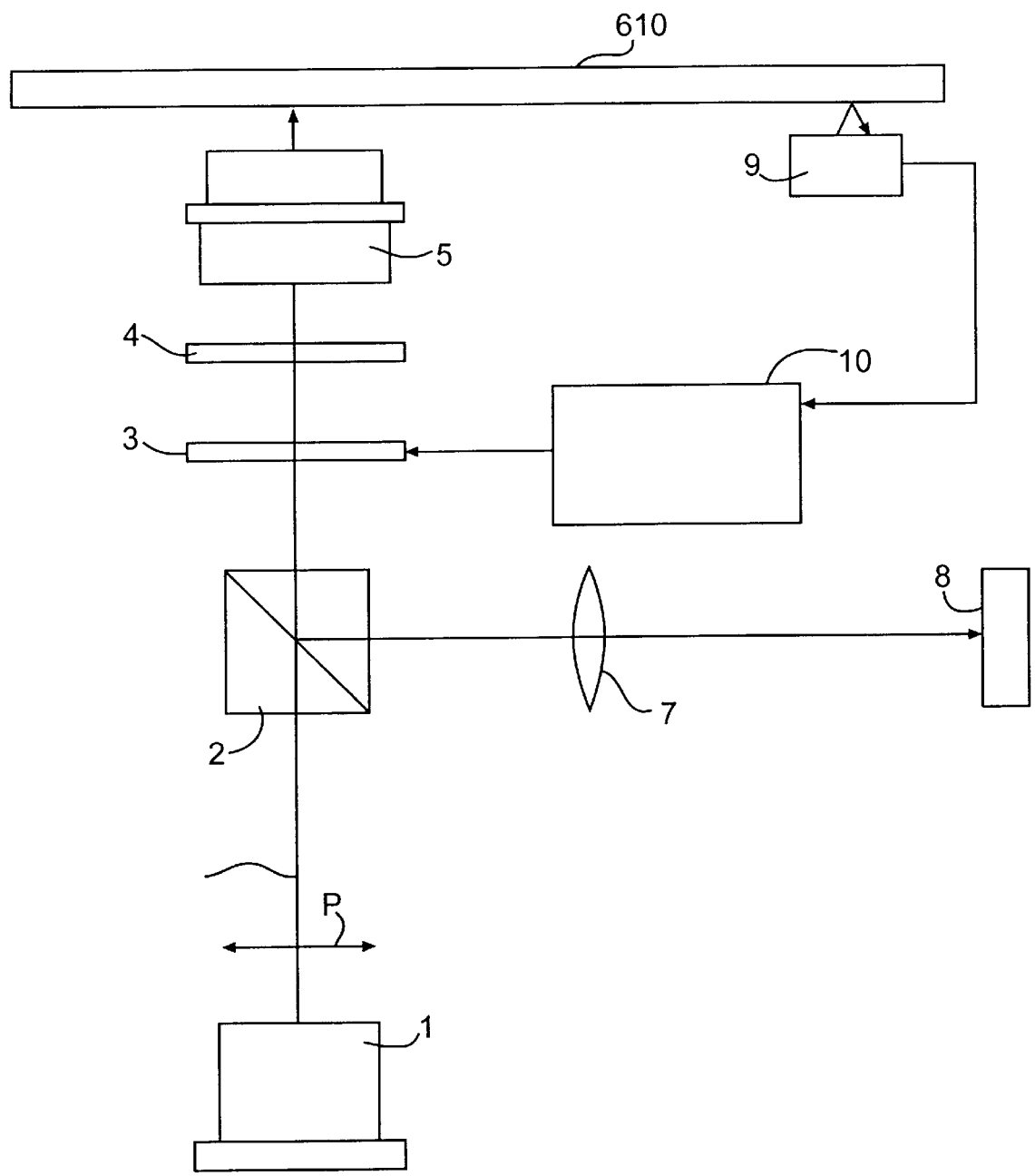
FIG. 1 is a diagram showing a structure of an optical pickup of a multi-layer disc playback apparatus according to the present invention.

FIG. 1 shows a structure of an optical pickup of a multi-layer disc playback apparatus according to the present invention.

In FIG. 1, reference numeral 1 denotes a laser source, 2 denotes a polarizing beam splitter, 3 denotes a liquid crystal panel as a liquid crystal element, 4 denotes a ¼ wavelength plate, 5 denotes an objective lens, 610 denotes a multi-layer disc, 7 denotes a condensing lens, 8 denotes a light receiver, 9 denotes a tilt sensor, and 10 denotes a liquid crystal panel control circuit.

Laser beam emitted from the laser source 1 passes the polarizing beam splitter 2 and then passes the liquid crystal panel 3 and ¼ wavelength plate 4, so that the beam is focused by the objective lens 5. A focal point is made on an information recording surface of the multi-layer disc 610. Reflection light from the information recording surface of the multi-layer disc 610 passes the objective lens 5, ¼ wavelength plate 4, liquid crystal panel 3 and polarizing beam splitter 2, so that it is focused on the light receiver 8 through the condensing lens 7.

The crystal axis of the ¼ wavelength plate 4 is disposed so that it intersects a polarizing plane of laser beam polarized linearly by the polarizing beam splitter 2 at an angle of 45°, which corresponds to a standard control level of the liquid crystal panel control circuit 10

In the aforementioned liquid crystal panel 3, liquid crystal molecules sandwiched by two glass substrates (not shown) are oriented. On an upper (or lower) transparent electrode (not shown) is formed a coaxial electrode pattern, which will be described later, and the other electrode is formed opposing that electrode pattern on the lower side (or upper side).

By variably controlling a voltage applied to each of the electrode patterns of the upper and lower transparent electrodes by means of the liquid crystal panel control circuit 10, wave front aberration, which is caused by a difference of thickness between an optimally designed recording layer for the optical pickup and a recording layer of the multi-layer disc that is to be played back, can be corrected.

Figure 2A:
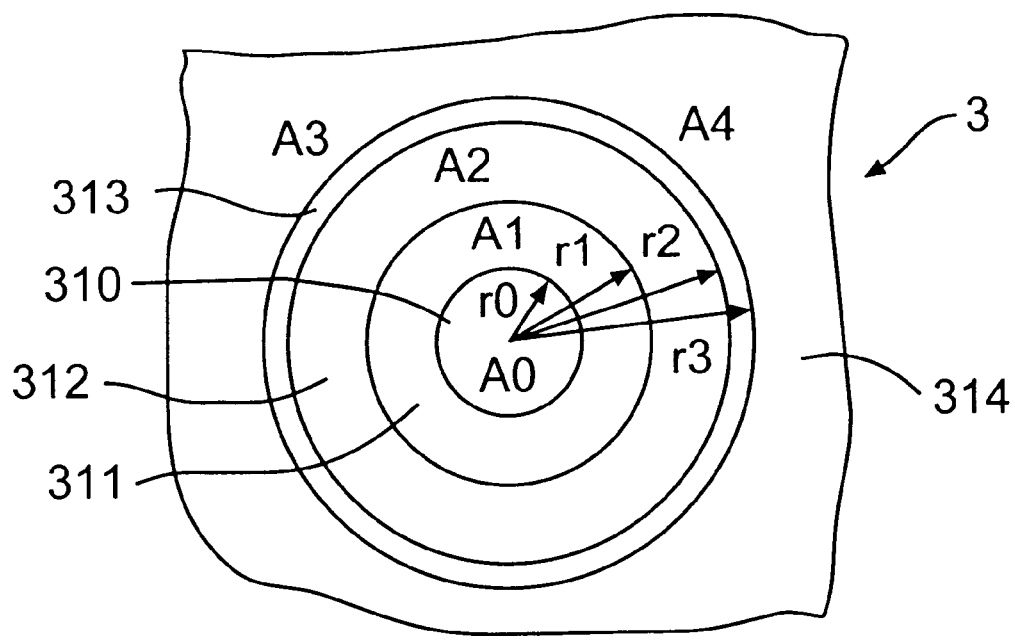
FIG. 2A is an explanatory view for explaining pattern division of an aberration correcting means in the multi-layer disc playback apparatus of the present invention and aberration correction.
Figure 2B:
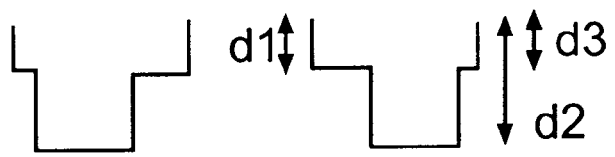
FIG. 2B illustrates a driving level for wave front aberration correction.

Referring to FIGS. 2A, 2B, a structure and operation of the liquid crystal panel will be described.

In FIG. 2A, reference numeral 3 denotes a liquid crystal panel and 310–314 denote each of coaxial transparent electrodes of the liquid crystal panel 3. FIG. 2B shows driving level for wave front aberration correction for the respective electrodes 310–314, which will be described later.

The liquid crystal panel 3 is formed by orienting liquid crystal molecules having refractive anisotropy between two glass substrates in a predetermined direction. Coaxial transparent electrodes 310–314 are formed on the upper (or lower) side thereof and electrodes opposing the upper (or lower) electrodes 310–314 are formed on the lower (or upper) side.

When driving voltages are applied to each of the electrodes of the liquid crystal panel 3 having such a structure, orientation of the liquid crystal molecules is deviated according to the electric field caused by the applied voltage. As a result, distribution of refractive index can be arbitrarily set in a sectional plane perpendicular to the advancement direction of beam flux passing the liquid crystal panel 3. The phase of wave front of beam flux can be controlled for each division area. That is, the liquid crystal panel 3 can be used as a refractive index changing means.

For example, a case in which the liquid crystal panel 3 having the transparent electrodes of 5-division pattern shown in FIG. 2A will be described. The transparent electrodes 310–314 of the liquid crystal panel 3 are divided to area A0 (electrode 310) of a circular electrode of r in radius, area A1 (electrode 311) of a hollow circular electrode having an outside radius of r1 and inside radius of r0, area A2 (electrode 312) of a hollow circular electrode having an outside radius of r2 and inside radius r1, area A3 (electrode 313) of a hollow circular electrode having an outside radius of r3 and inside radius of r2, and area A4 (electrode 314) of an electrode from which a circular shape having a radius of r3 is removed.

Voltages shown in FIG. 2B are applied to each of the electrodes 310–314. That is, 0 volt is applied to the electrodes 310, 314, d1 and d3 volts are applied to the electrodes 311, 313, respectively, and d2 volt is applied to the electrode 312. Electrode separating gaps (not shown) are provided between the adjacent electrodes. Here, d1 and d3 are set to the same level and the axis of the light beam is made to coincide with the center of concentric circles of the respective electrodes. The respective radii r0–r3 are set to values corresponding to wave front aberrations in the radial direction of the light beam. The driving levels of the electrodes 310–314 can be changed by the three values 0, d1, d2 in the form of digital signal by means of a simple driving circuit. By providing passage light flux with a phase difference, the wave front aberration can be corrected. That is, the liquid crystal panel 3 functions as a wave front aberration correcting means.

Referring to FIGS. 3A–3G, correction of wave front aberration in the multi-layer disc playback apparatus of the present invention will be described.

Point O on each of the horizontal axis of FIGS. 3A–3C, 3E–3F corresponds to an optical axis and D–D' indicates a linear position (e.g., pupil face of an objective lens) perpendicular to the optical axis passing through the optical axis O. The vertical axis L indicates the amount of wave front aberration.

Figure 3A:
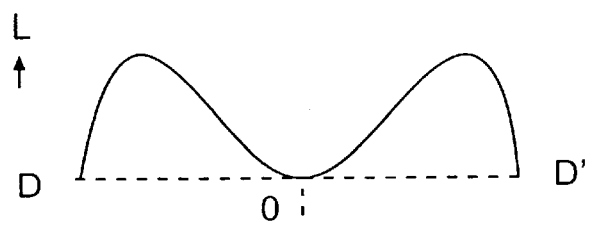
FIG. 3A is a diagram showing wave front aberration on a pupil face of an objective lens.
Figure 3B:
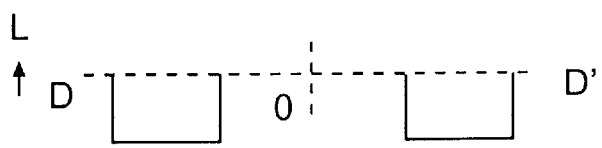
FIG. 3B is a diagram showing a correcting voltage applied to coaxial divided electrodes of a liquid crystal panel divided into three coaxial portions.
Figure 3C:
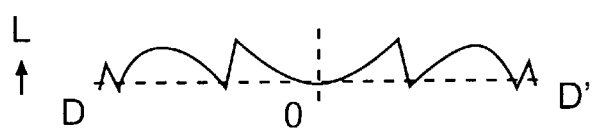
FIG. 3C is a diagram illustrating the remaining wave front aberration after a correcting voltage is applied to coaxial divided electrodes of a liquid crystal panel divided into three coaxial portions.
Figure 3D:
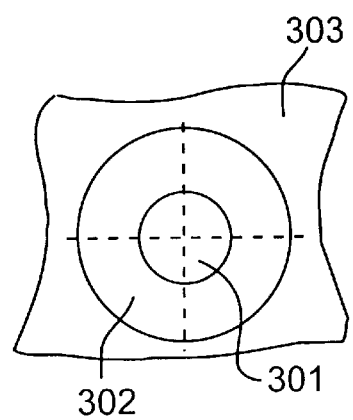
FIG. 3D is a diagram showing a liquid crystal panel comprising three coaxial portions.
Figure 3E:
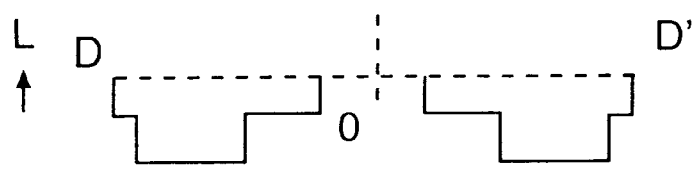
FIG. 3E is a diagram showing a correcting voltage applied to coaxial divided electrodes of a liquid crystal panel divided into five coaxial portions.
Figure 3F:
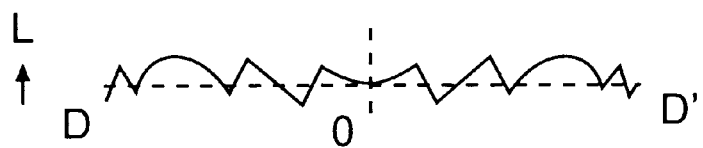
FIG. 3F is a diagram illustrating the remaining wave front aberration after a correcting voltage is applied to coaxial divided electrodes of a liquid crystal panel divided into five coaxial portions.
Figure 3G:
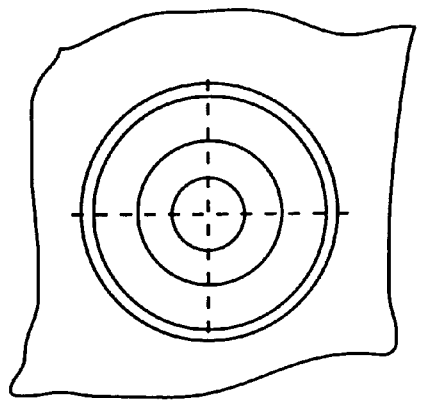
FIG. 3G is a diagram showing a liquid crystal panel comprising five coaxial portions.

FIG. 3D illustrates a 3-division electrode in which the transparent electrode of a liquid crystal panel is divided into three coaxial portions, and FIG. 3G shows a division pattern of a 5-division electrode. FIG. 3A shows a distribution of wave front aberration caused by the thickness of layers between an optimally designed recording layer for the optical pickup and a recording layer from which data is to be reproduced. Usually, the laser beam is a circular spot and wave front aberration changes in the radial direction. If the thickness of the layers increases, two peaks of wave front aberration, as shown in FIG. 3A, is further enlarged.

FIG. 3A is a diagram showing wave front aberration on a pupil face of an objective lens, obtained by converting wave front aberration caused on the recording layer by following the tracks of a light beam. When such wave front aberration is caused, drive control is carried out by applying a voltage to the electrode 302 of the liquid crystal panel comprising three-division electrode, shown in FIG. 3D, so as to supply a phase difference opposite to the wave front aberration to the light beam. Voltages are applied to the electrodes 301, 303 so as to pass the light beam without supplying a phase difference.

By applying different voltages to each of the coaxially divided electrodes of the liquid crystal panel as shown in FIG. 3B, the wave front aberration shown FIG. 3A is corrected. As a result, remaining wave front aberration can be reduced, as shown in FIG. 3C, so that a diameter of beam spot can be focused.

Like FIGS. 3B–3D, FIGS. 3E–3G show correcting amounts of wave front aberration and a result of the correction when the transparent electrode of the liquid crystal panel is divided into coaxial five portions as shown in FIG. 3G.

In this case, drive control is carried out by applying a voltage shown in FIG. 3E to each electrode of the liquid crystal panel comprising 5-division electrodes, as shown in FIG. 3G, so as to supply a phase difference to the passing beam, which is opposite to the wave front aberration shown in FIG. 3A. With this, further precision wave front aberration correction can be carried out. That is, as shown in FIG. 3F, remaining wave front aberration can be further reduced as compared to FIG. 3C so that a diameter of beam spot can be minimized.

As is evident from FIG. 3F, the 5-division pattern has reduced the remaining wave front aberration more than the 3-division pattern. That is, it can be understood that an effect of correcting the wave front aberration is improved by increasing the number of divisions of the electrode.

Figure 4:
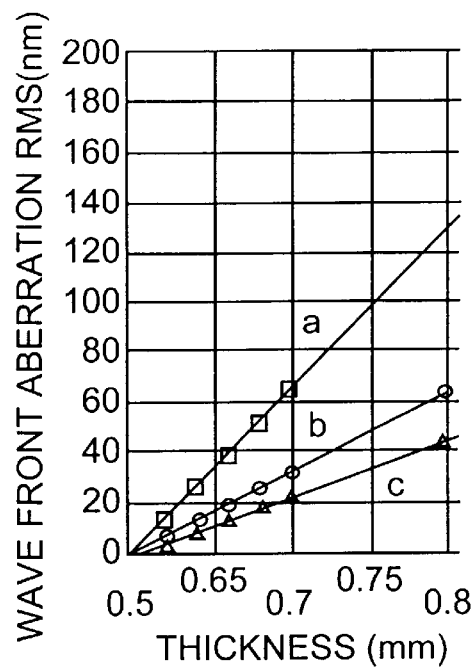
FIG. 4 is a graph showing wave front aberration with respect to disc thickness in a conventional multi-layer disc playback apparatus and the multi-layer disc playback apparatus of the present invention.

A behavior of correction of wave front aberration due to disc thickness from the recording layer optimally designed for the optical pickup to a recording layer, which is to be played back in the aforementioned multi-layer disc playback apparatus is obtained by simulation and is shown in FIG. 4.

That is, the line a in FIG. 4 indicates wave front aberration when aberration correction is not carried out in a conventional playback apparatus. The line b indicates a corrected aberration when the electrode of the liquid crystal panel is divided to three patterns. The line c of FIG. 4 shows a corrected aberration when the electrode of the liquid crystal panel is divided to five patterns. The axis of ordinate indicates a generated wave front aberration by nm based on effective value RMS and the abscissa axis indicates a thickness of multi-layer disc by mm.

As compared to the case of no aberration correction indicated by line a of FIG. 4, the aberration can be reduced to substantially half by corrections shown by line b of FIG. 4 using a liquid crystal panel. By changing the electrode of the liquid crystal panel from 3-division pattern to 5-division pattern, the aberration can be further reduced as is evident from comparing the lines b and c of FIG. 4. From FIG. 4, it can be understood that the effect of aberration correction based on the present invention is large.

Figure 5:
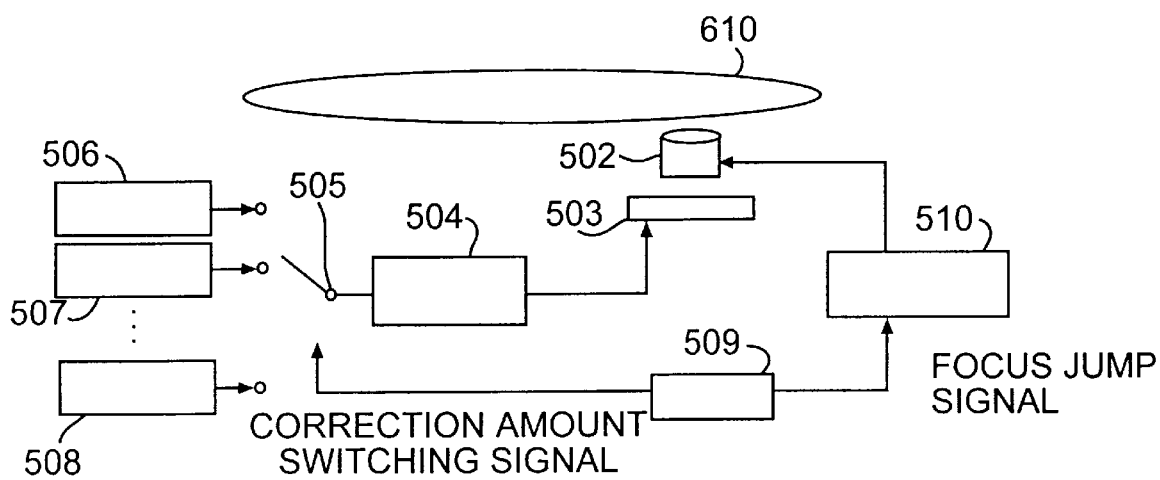
FIG. 5 is a block diagram of the multi-layer disc playback apparatus of the present invention.
Figure 6:
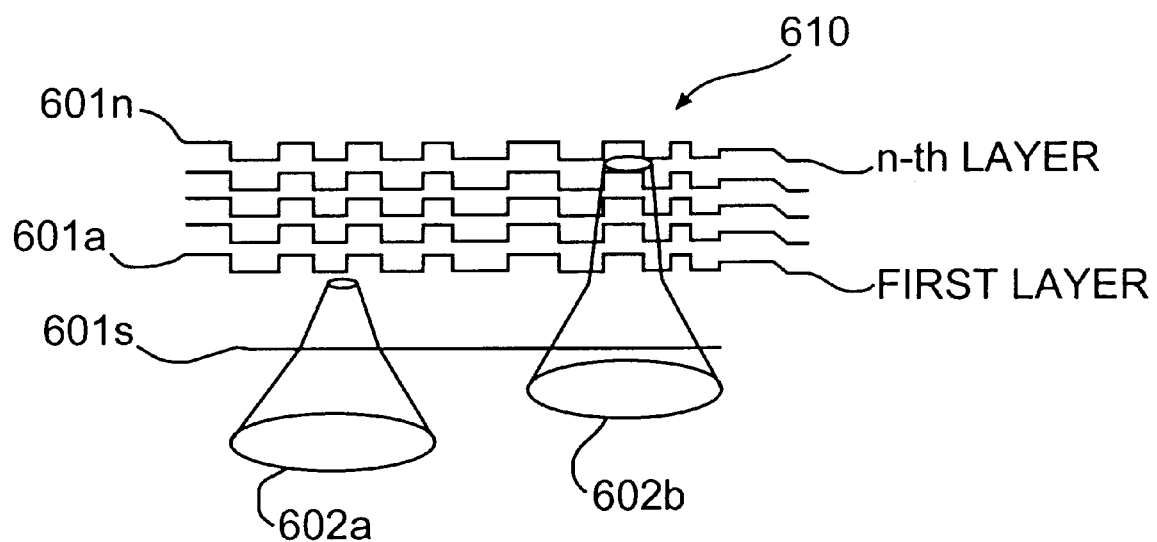
FIG. 6 is a schematic view of a conventional multi-layer disc playback.

Next, FIG. 5 shows a block diagram of a multi-layer disc playback apparatus containing the aforementioned aberration correcting means.

A multi-layer disc 610 is rotated by a disc holding means and disc rotation control device (not shown). An objective lens actuator 502 of recorded information playback pickup is provided opposing the multi-layer disc 610 and the objective lens therein is driven so as to focus a light beam on a recording layer selected depending on information read from the multi-layer disc 610 or a user's instruction. A liquid crystal panel 503, provided on part of the optical system, is driven and controlled by the liquid crystal driver 504.

The objective lens actuator 502 is driven and controlled by a focus driver 510 and a focus jump signal is supplied to the focus driver 510 from a control unit 509 so as to play back a recording layer according to an operation instruction.

The control unit 509 determines an amount of aberration correction that is to be supplied to the liquid crystal driver 504. Memories 506–508 preliminarily store aberration correction amounts corresponding to each of the recording layers of the multi-layer disc 610. The control unit 509 operates a selection switch 505 and controls so as to supply an aberration correction amount corresponding to a recording layer to be played back from one of the memories 506–508 to the liquid crystal driver 504.

With such a structure, when a desired recording layer of the multi-layer disc 610 is played back, the liquid crystal panel 503 is driven so as to supply an aberration correction amount corresponding to that recording layer. Thus it is possible to correct and reduce an aberration caused by a thickness of the multi-layer disc 610, so that the play-back characteristic of the multilayer disc can be improved. FIG. 5 shows only the portion directly related to the liquid crystal panel 5 of the present invention, while other servo control portions and signal processing portions provided normally are not shown.

The aforementioned embodiment is so structured such that the correction amount for each recording layer is stored and a correction amount corresponding to a recording layer to be played back is read from the memory. In another embodiment of the present invention, it is possible to determine an aberration correction amount based on calculations stemming from the principle that the reproduction signal (RF signal) level differs depending on each recording layer.

Generally, because the reflection light amount decreases as the distance from the surface of the substrate increases, the RF signal level lowers. That is, when the RF signal level is high, it is determined that a recording layer closer to the surface of the substrate is being played back, and therefore the aberration correction amount is decreased. When the RF signal level is low, it is determined that a recording layer further from the surface of the substrate is being played back, and therefore the aberration correction amount is increased.

In an alternative embodiment, the aberration correction amount is not determined when the recording layer to be played back is selected. After the objective lens is driven to focus the light beam on a recording layer to be played back, the aberration correction amount is controlled such that the RF signal obtained by reading this recording layer attains a maximum level.

According to the present invention, as explained above, when a multi-layer disc is played back, its wave front aberration which occurs due to a difference of distance between the optimally designed recording layer for the optical pickup and each of the recording layers is corrected. Thus, it is possible to play back a multi-layer disc having a higher recording density per layer.

It will be apparent to those skilled in the art that various modifications and variations can be made in the improved optical pickup and multi-layer disc playback apparatus of the present invention. Thus, it is intended that the present invention cover the modifications and variations of the invention provided they come within the scope of the appended claims and their equivalents.

What is claimed is:

1. An optical pickup for use in a multi-layer disc playback apparatus for playing back a multi-layer disc having a plurality of recording layers, comprising:

wave front aberration correcting means disposed in an optical path between a light source and an objective lens for correcting wave front aberration of light emitted from the light source in accordance with a selected recording layer of the multi-layer disc to be played back, wherein said correcting means contains a refractive index changing means for changing a refractive index based on an applied voltage, and an electrode for applying voltage to the refractive index changing means; and control means for controlling the wave front aberration correcting means to selectively optimize the wave front aberration correction as a function of the distance from the selected recording layer to an external surface of the multi-layer disc.

2. The optical pickup according to claim 1, wherein the electrode is coaxially divided.

3. The optical pickup according to claim 1, wherein the wave front aberration correcting means is composed of liquid crystal elements.

4. A multi-layer disc playback apparatus for playing back a multi-layer disc having a plurality of recording layers, comprising:

selection means for selecting a recording layer to be played back;

reproduction means for reproducing information recorded in the recording layer according to a signal read by an optical pickup;

wave front aberration correcting means disposed in an optical path between a light source and an objective lens of the optical pickup for correcting wave front aberration of light emitted from the light source, wherein said correcting means contains a refractive index changing means for changing a refractive index based on an applied voltage, and an electrode for applying voltage to the refractive index changing means; and control means for controlling the wave front aberration correcting means to selectively optimize the wave front aberration correction as a function of the distance from the selected recording layer to an external surface of the multi-layer disc.

5. The multi-layer disc playback apparatus according to claim 4, wherein the electrode is coaxially divided.

6. The multi-layer disc playback apparatus according to claim 4, wherein the wave front aberration correcting means is composed of liquid crystal elements.

7. A multi-layer disc playback apparatus for playing back a multi-layer disc having a plurality of recording layers, comprising:

selection means for selecting a recording layer of the multi-layered disc to be played back;

reproduction means for reproducing information recorded in the recording layer according to a signal read by an optical pickup;

wave front aberration correcting means disposed in an optical path between a light source and an objective lens of the optical pickup for correcting wave front aberration of light emitted from the light source, wherein said correcting means contains a refractive index changing means for changing a refractive index based on an applied voltage, and an electrode for applying voltage to the refractive index changing means; and control means for controlling the wave front aberration correcting means to selectively optimize the wave front aberration correction as a function of the distance from the selected recording layer to an external surface of the multi-layer disc.

8. The multi-layer disc playback apparatus according to claim 7, wherein the control means calculates an aberration correction amount such that the reproduction signal read by the optical pickup attains a maximum level.

9. The multi-layer disc playback apparatus according to claim 7, wherein the electrode is coaxially divided.

10. The multi-layer disc playback apparatus according to claim 7, wherein the wave front aberration correcting means is composed of liquid crystal elements.

11. The multi-layer disc playback apparatus according to claim 4, wherein the control means includes a memory for storing control information corresponding to each of a plurality of the recording layers, and driving means for driving the wave front aberration correcting means according to the control information, wherein the control means reads out the control information corresponding to a recording layer to be played back from the memory and supplies the control information to the driving means.

12. The multi-layer disc playback apparatus according to claim 4, wherein the control means controls the wave front aberration correcting means according to the signal read by the optical pickup.

* * * * *